(12) United States Patent
Rossholm et al.

(10) Patent No.: US 8,548,045 B2
(45) Date of Patent: Oct. 1, 2013

(54) METHOD AND APPARATUS FOR VIDEO ENCODING

(75) Inventors: Andreas Rossholm, Stockholm (SE); Per Thorell, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 733 days.

(21) Appl. No.: 12/294,446

(22) PCT Filed: Mar. 29, 2007

(86) PCT No.: PCT/EP2007/002785
§ 371 (c)(1),
(2), (4) Date: Jun. 15, 2011

(87) PCT Pub. No.: WO2007/110242
PCT Pub. Date: Oct. 4, 2007

(65) Prior Publication Data
US 2011/0243221 A1    Oct. 6, 2011

Related U.S. Application Data

(60) Provisional application No. 60/743,981, filed on Mar. 30, 2006.

(30) Foreign Application Priority Data

Mar. 29, 2006    (EP) ..................................... 06111919

(51) Int. Cl.
*H04N 7/26*    (2006.01)
(52) U.S. Cl.
USPC ................................. 375/240.03; 375/240.24
(58) Field of Classification Search
USPC ........................................ 375/240.03, 240.24
See application file for complete search history.

(56) References Cited

U.S. PATENT DOCUMENTS

| | | |
|---|---|---|
| 6,208,688 B1 | 3/2001 | Seo et al. |
| 2005/0036698 A1* | 2/2005 | Beom .......................... 382/239 |
| 2005/0053150 A1 | 3/2005 | Hsu et al. |
| 2005/0169369 A1 | 8/2005 | Lee |

FOREIGN PATENT DOCUMENTS

| | | |
|---|---|---|
| EP | 1 379 091 A1 | 1/2004 |
| EP | 1 722 571 A1 | 11/2006 |
| WO | 2005/086492 A | 9/2005 |

OTHER PUBLICATIONS

PCT International Preliminary Report on Patentability, mailed Mar. 26, 2008, in connection with International Application No. PCT/EP2007/002785.

(Continued)

*Primary Examiner* — Sath V Perungavoor
*Assistant Examiner* — Jeffrey Williams
(74) *Attorney, Agent, or Firm* — Potomac Patent Group PLLC (57) ABSTRACT

A method for encoding a video sequence of video frames. Each video frame includes a plurality of macro blocks. One video frame of the video sequence is encoded based on a first quantization parameter value for generating a first bit stream of encoded macro blocks (12). Transmission of a subset of the encoded macro blocks from the first bit stream is initiated (13). It is determined if the first bit stream exceeds a bit budget. If the first bit stream is determined to exceed the bit budget, a second quantization parameter value, which is larger than the first quantization parameter value, is generated. Otherwise, the second quantization parameter value, which is smaller than the first quantization parameter value, is generated. At least a part of the video frame is encoded based on the second quantization parameter value for generating a second bit stream of encoded macro blocks (15, 15*a*). The first bit stream and the second bit stream are then merged (17, 17*a*). An apparatus for performing the method is also disclosed.

18 Claims, 6 Drawing Sheets

(56) References Cited

OTHER PUBLICATIONS

PCT International Search Report, mailed Oct. 10, 2007, in connection with International Application No. PCT/EP2007/002785.

Westerink, P.H. et al.: "Two-pass MPEG-2 variable-bit-rate encoding" IBM J. Res. Develop., vol. 43, No. 4, Jul. 4, 1999, pp. 471-488, XP002396114.

* cited by examiner

METHOD AND APPARATUS FOR VIDEO ENCODING

CROSS-REFERENCE TO RELATED APPLICATIONS

This application claims priority under 35 U.S.C. §119 to European Patent Application No. 06111919.4, filed Mar. 29, 2006, which is hereby incorporated herein by reference in its entirety. This application also claims the benefit of U.S. Provisional Application No. 60/743,981, filed Mar. 30, 2006, which is hereby incorporated herein by reference in its entirety.

TECHNICAL FIELD

The present invention relates to a method and an apparatus for encoding a video sequence.

BACKGROUND

Video encoding is used for reducing the size, in terms of bytes, of a video sequence at the expense of a reduced image quality. In e.g. video telephony, a video sequence may be encoded in a real-time video encoder in a transmitter, e.g. in accordance with the MPEG4, H.263, or H.264 standard. The encoded video sequence may in turn be transmitted over a wired or wireless communication channel with a limited bandwidth to a receiver. In such an application, the average bit rate of the encoded video sequence must not be larger than the bandwidth of the communication channel. Further, in order for a user of the receiver to perceive a reasonable video quality, it is important that the bit rate of the encoded video sequence is constant or nearly constant. In other words, the size of each encoded video frame should be approximately the same. If the bit rate of the encoded video sequence oscillates, the user of the receiver will experience undesired artifacts. For example, the user may experience a long end-to-end delay or jitter between the video frames. The perceived video frame rate may be lower than the actual average video frame rate if the time intervals between displayed video frames are irregular.

An oscillating bit rate of the encoded video stream may, in principle, be compensated for by introducing a buffer in the receiver. Then, the received encoded video sequence may be delayed in the receiver and the video frames may be presented at a constant video frame rate, e.g. on a display of the receiver, even if the video frames are received at a variable rate. However, in a two-way communication scenario, such as video telephony, the introduction of a delay is highly undesirable and may be a source of annoyance for the users. For this reason, it is also important to have a short latency in the video encoder. Otherwise, the users will also experience an undesired delay in the communication.

A quantization parameter (QP) is a parameter that determines the degree of compression of an encoded video frame; a smaller QP results in a better image quality and a larger size, whereas a larger QP results in worse image quality and a smaller size. However, the resulting size of the encoded video frame is not only dependent on the QP, but may also depend on e.g. the contents (e.g., pixel data such as luminance and chrominance data) of the video frame and previous video frames. For example, for a fixed QP value, if there is a large difference between the contents of the video frame and the previous video frame, e.g. due to a large amount of motion of objects in the video frame, the resulting size of the encoded video frame is normally larger than if there is only a small difference between the contents of the video frame and the previous video frame.

In order to reduce bit-rate oscillations in the encoded video sequence, a rate-control algorithm is normally used. Rate control is normally achieved by dynamically varying the QP during the encoding. For example, a video frame may be divided into a plurality of macro blocks having, e.g., 16×16 pixels. During the encoding of a video frame, the QP value may be dynamically varied between each macro block, e.g. based on the sizes of previously encoded macro blocks, in order to control the bit rate. Such an approach for controlling the bit rate allows for a short latency in the video encoder. However, known bit-rate control algorithms of this type causes high bit-rate oscillations.

In a multi-pass video encoding scheme, each video frame may be encoded more than once with different QP values in order to reach a desired bit rate. Multi-pass video encoding may result in lower bit-rate oscillations compared with encoding each video frame only once, such as described in the publication: WESTERINK P H et al: "Two-pass MPEG-2 variable-bit-rate encoding" IBM J. RES. DEVELOP., vol. 43, no. 4, 4 Jul. 1999 (1999-07-04), pages 471-488, XP002395114. However, known multi-pass video encoders suffer from long latency, which is undesired in a video encoder for e.g. video telephony.

SUMMARY

It is an object of the present invention to provide video encoding with improved bit-rate control.

According to a first aspect of the invention, there is provided a method for encoding a video sequence of video frames, each video frame including a plurality of macro blocks, wherein at least a part of the video frame is encoded based on a first quantization parameter value for generating a first bit stream of encoded macro blocks; comprising: initiating transmission of a first subset of the encoded macro blocks from the first bit stream; generating at least one further quantization parameter value; encoding at least a part of the video frame based on the at least one further quantization parameter value for generating at least one further bit stream of encoded macro blocks; and initiating transmission of a second subset of the encoded macro blocks following the already transmitted first subset of macro blocks from either of said bit streams of encoded macro blocks.

In an embodiment, the method may further comprise: merging said first and said at least one further bit stream into a third bit stream before initiating transmission of the second subset of the encoded macro blocks. The method may further comprise: parsing the first and the at least one further bit stream for determining the sizes and locations of individual encoded macro blocks within the first and the at least one further bit stream. The method may further comprise: generating additional quantization parameter values; merging said additional quantization parameter values with said third bit stream into a fourth bit stream; initiating transmission of a third subset of the encoded macro blocks following the already transmitted first and second subset of macro blocks from the fourth bit stream. The at least one further quantization parameter value may consist of a second quantization parameter value. Alternatively, the at least one further quantization parameter value may comprise several quantization parameter values. The at least one further quantization parameter value may be generated based on said first quantization parameter value and a bit budget. The first and the at least one further quantization parameter values may be variable according to predetermined functions. The function may be smaller for macro blocks positioned close to the center of the video frame and larger for macro blocks positioned close to the periphery of the video frame.

In another embodiment, the encoded macro blocks may be selected from the first bit stream and the second bit stream, so that the first K encoded macro blocks are selected from the first bit stream and the remaining N–K macro blocks are selected from the second bit stream, where N is the total number of macro blocks in the video frame and K is an integer which is selected so that the absolute value of the difference between the number of bits in the third bit stream and bit budget is minimized.

In a further embodiment, the method may further comprise: decoding macro blocks subject to transmission for generating a decoded video frame; and using said decoded video frame as a reference video frame during encoding of a subsequent video frame.

In another aspect, there is provided a computer program product comprising computer program code means for executing the method mentioned above when said computer program code means are run by an electronic device having computer capabilities.

In another further aspect, there is provided a computer readable medium having stored thereon a computer program product comprising computer program code means for executing the method mentioned above when said computer program code means are run by an electronic device having computer capabilities.

In a still further aspect, there is provided an apparatus for encoding a video sequence comprising: an encoder unit adapted to encode a video frame for generating a first bit stream of encoded macro blocks based on a first quantization parameter value and at least one further bit stream of encoded macro blocks based on at least one further quantization parameter value; a parameter unit operatively connected to the encoder unit, where the parameter unit is adapted to generate the at least one further quantization parameter value; and a transmit-control unit operatively connected to the encoder unit and the merging unit, where the transmit-control unit is adapted to initiate transmission of a first subsets of encoded macro blocks included in the first bit stream and to initiate transmission of a second subset of encoded macro blocks following said first subset of macro blocks from either of said bit streams of encoded macro blocks.

In an embodiment the apparatus further comprises a merging unit operatively connected to the encoder unit, the merging unit being adapted to generate a third bit stream by merging the first bit stream and the further bit streams.

In a yet further aspect, there is provided a communication unit, wherein the communication unit comprises the apparatus mentioned above. The communication unit may be a mobile telephone with video telephony capability.

It is an advantage of some embodiments that encoded video may be generated with relatively low oscillations in the bit rate. As a consequence, artifacts perceived by a user receiving the encoded video, e.g. during a video telephony conversation, may be removed or reduced compared with when known video encoders for video telephony are used.

Due to the relatively low oscillations in bit rate, there is no need for delaying the encoded video in a receiver using e.g. a buffer in order to compensate for bit-rate oscillations. This is advantageous for reducing the overall latency or delay.

It is a further advantage of some embodiments that transmission of encoded macro blocks, e.g. over a communication channel, may be initiated before all macro blocks have been read out from an image sensor. Thereby an overall latency or delay may be reduced compared with encoding schemes where the whole image needs to be read out before transmission can be initiated.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of the invention will appear from the following detailed description of the invention, reference being made to the accompanying drawings, in which.

DETAILED DESCRIPTION

Figure 1:
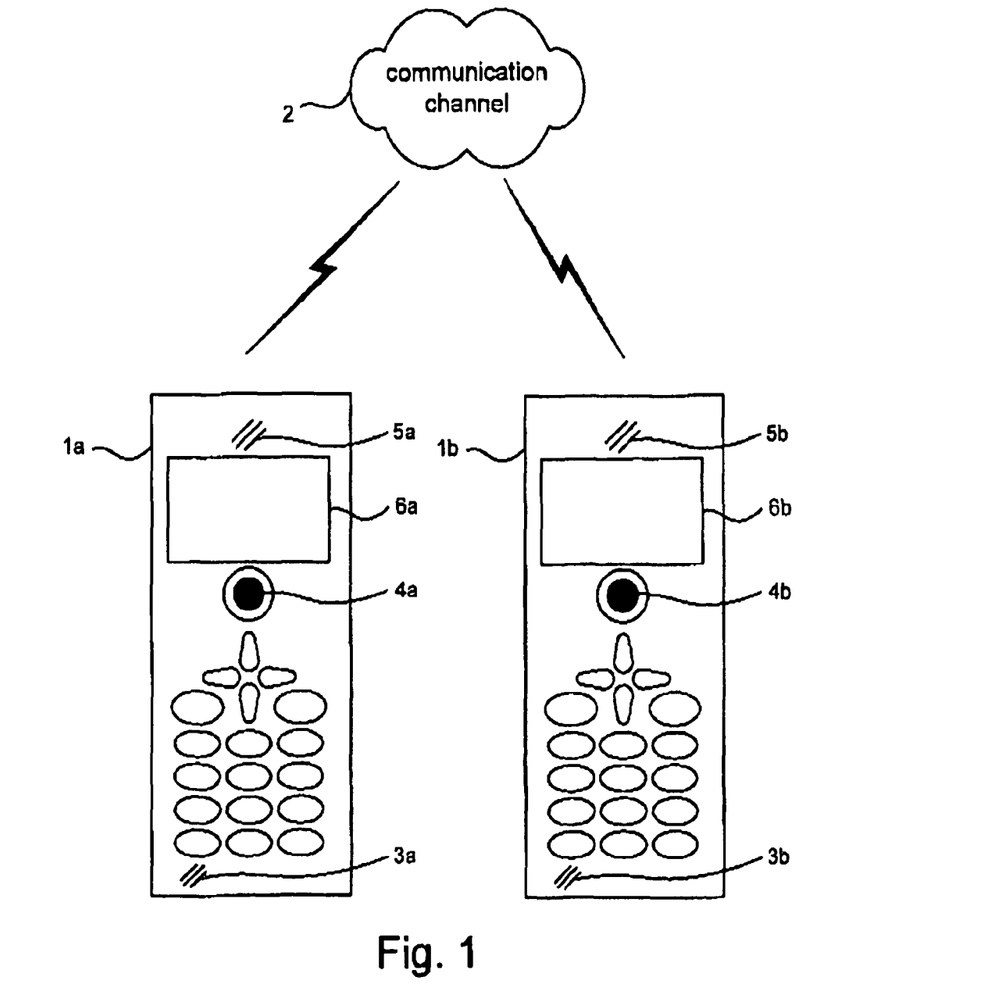
FIG. 1 illustrates a first communication unit operable to communicate with a second communication unit via a communication channel.

FIG. 1 illustrates an environment where the present invention may be applied. A first communication unit 1a is in communication with a second communication unit 1b via a communication channel 2 for transmission and reception of video sequences in real time, e.g. during a video-telephony session. The communication channel 2 may e.g. be a wireless Universal Mobile Telecommunications System (UMTS) communication channel, but other types of wired or wireless communication channels may be used as well.

The first communication unit 1a may be equipped with a microphone 3a, a camera unit 4a, a loudspeaker unit 5a, a display unit 6a, and other types of circuits such as one or more computational units and communication-interface circuits (not shown in FIG. 1) for enabling e.g. video telephony. The microphone 3a, the camera unit 4a, the loudspeaker unit 5a, and the display unit 6a may also, in different combinations, be operable for other purposes, such as recording and playback of audio and video sequences and plain voice communication. Similarly, the second communication unit 1b may be equipped with a microphone 3b, a camera unit 4b, a loudspeaker unit 5b, a display unit 6b, and other types of circuits such as one or more computational units and communication-interface circuits (not shown in FIG. 1).

In FIG. 1, the first and second communication unit 1a, 1b are embodied as mobile telephones. However, other types of portable or stationary communication units, such as a personal digital assistant (PDA), a communicator, a smart phone, a laptop computer, or a stationary computer equipped with communication capability is possible within the scope of the invention. Further, the microphone 3a-b, the camera unit 4a-b, the loudspeaker unit 5a-b, and the display unit 6a-b need not be part of the communication unit 1a-b. Any of them may be embodied with an external device and connected to the communication unit via a communication interface, such as an RS-232 interface, a universal serial bus (USB) interface, or a short range radio interface such as a Bluetooth interface.

In addition to the above, each of the first and the second communication unit 1a, 1b may be provided with a video encoding unit (not shown in FIG. 1) and a video decoding unit (not shown in FIG. 1).

For the encoding of a video frame, the video frame may be partitioned into a plurality of macro blocks (MBs). For example, the video frame may be compatible with the quarter common intermediate format (QCIF) and comprise 176×144 pixels. The video frame may then be partitioned into nine rows of MBs, where each row consists of eleven MBs. Each MB then represents an image area of 16×16 pixels and may in turn be partitioned into four luminance blocks and two chrominance blocks, each having 8×8 pixels.

Encoding of a video frame in accordance with e.g. the MPEG4, H.263, or H.264 standards may be performed as outlined in the following. The chrominance and luminance blocks in each MB may be subject to a two-dimensional discrete cosine transform (OCT). In a quantization step, the resulting DCT-coefficients may be divided by a value derived from a quantization parameter (QP) value and the resulting quotients may be rounded or truncated. The value derived from the QP value may e.g. be a linear or nonlinear function of the QP value. Thereby, lossy compression of the image data is obtained and the number of bits required for representing a DCT coefficient may be reduced. Lossless compression may be applied to the results of the quantization step to obtain a further compression of the image data.

So called predictive encoding may be used to exploit correlation between consecutive video frames in order to obtain an efficient compression of data. Instead of encoding the actual image content of an MB, the difference in chrominance and luminance data between an MB and an image area of a previous video frame may be encoded. To enable decoding of the encoded video, a so called motion vector pointing between the coordinates of said image area of said previous video frame and the coordinates of the MB may be included in the output data from the encoder.

A result of the encoding is a bit stream of encoded MBs. In addition to the quantized DCT coefficients and the motion vectors, the bit stream may include header information regarding e.g. which QP values have been used for encoding individual MBs.

Figure 2:
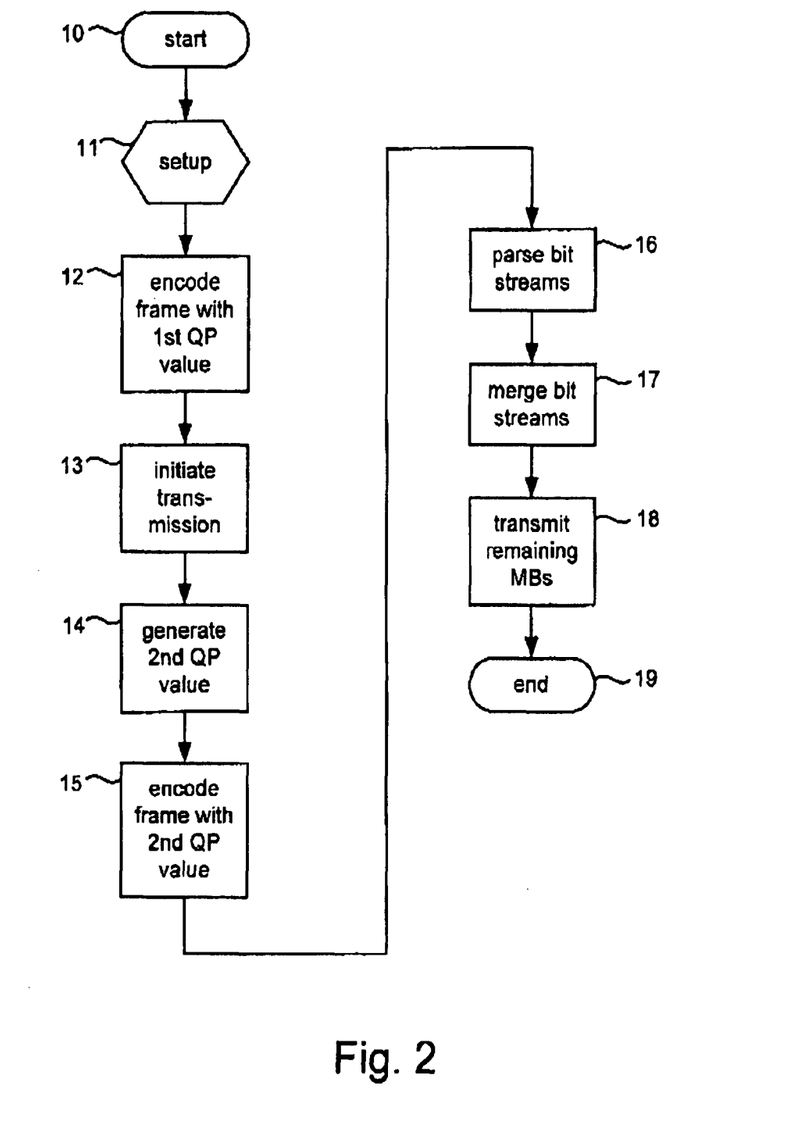
FIG. 2 is a flow chart of an embodiment of a method for encoding a video frame.

FIG. 2 shows a flow chart of a method for encoding a video sequence according to an embodiment of the invention, wherein the bit rate of encoded video may be controlled. The flow chart of FIG. 2 illustrates the encoding of a single video frame. The encoding is started in step 10. Setup of encoding parameters is performed in step 11. The setup may include the step of deciding a bit budget for the video frame. The bit budget may be based on a bandwidth of the communication channel 2 and a video frame rate (e.g. number of video frames per second) of the video sequence. The average bit budget for a video frame may, for example, be given by the ratio between the bandwidth (bits per second) and the video frame rate (video frames per second). The bit budget for each video frame may be set individually, e.g. based on the sizes of previous video frames, in a known way. For example, the bit budget for a video frame may be set below the average bit budget if the previous video frame exceeded its bit budget.

Additionally or alternatively, the setup step 11 may include the step of generating a first QP value. If the video frame to be encoded is the first video frame to be encoded, a predefined QP value may be used. Alternatively, if the video frame to be encoded is not the first video frame to be encoded, the first QP value may be based on QP values used for encoding the previous video frame. For example, the first QP value may be an average value of QP values used for encoding the previous video frame. In an alternative embodiment, the QP value used for encoding the last MB of the previous video frame is selected as the first QP value. In a further alternative embodiment, a weighted average of the QP values used for encoding the n previous video frames, where n is an integer, is selected as the first QP value.

In step 12, the video frame is first encoded, e.g. by using a known method for encoding a video frame compatible with any of the MPEG4, H.263, or H.264 standards as outlined above, based on the first QP value. For example, each of the MBs may be encoded using the first QP value. The encoding in step 12 results in a first bit stream of encoded MBs.

Transmission of a part of the first bit stream, representing a subset of the encoded MBs therein, may be initiated or started in step 13. In order to obtain an overall short latency, the encoded MBs to be transmitted may be transmitted directly after having been generated. Hence, step 12 need not be fully completed before step 13 is started.

The resulting size (number of bits) of the first bit stream may be determined in step 14. Further, a second QP value may be generated based on the first QP value, the size of the first bit stream, and the bit budget. For example, if the first bit stream exceeds the bit budget, the second QP value may be larger than the first QP value. Further, if the first bit stream does not exceed the bit budget, the second QP value may be smaller than the first QP value. The second QP value may e.g. be generated using a look-up table. The look-up table may e.g. be addressed with the first QP value and the ratio between the size of the first bit-stream and the bit budget. For example, if the first bit stream has exceeded the bit budget by 10%, the look-up table may be addressed with the first QP value and 1.1, which is the ratio between the size of the first bit stream and the bit budget in this example. The values for the second QP value stored in the look-up table may e.g. be pre-programmed during manufacturing.

In step 15, the video frame may be encoded based on the second QP value. For example, each of the MBs may be encoded using the second QP value. The encoding in step 15 results in a second bit stream of encoded MBs. If the second QP value is larger than the first QP value, the size of the second bit stream may be smaller than that of the first bit stream. On the other hand, if the second QP value is smaller than the first QP value, the size of the second bit stream may be larger than that of the first bit stream.

In step 16, the first and the second bit stream may be parsed. The locations and sizes of individual encoded MBs within the first and the second bit stream may be determined. The location of an encoded MB within a bit stream may e.g. be represented with a bit position in the bit stream of a first bit of the encoded MB.

The content of the first and the second bit stream both represent the same video frame. In step 17, the first and the second bit stream may be merged for generating a third bit stream of encoded MBs. The content of the third bit stream should also represent said video frame. Encoded MBs may be selectively chosen either from the first bit stream or from the second bit stream to be inserted into the third bit stream in order to reach or as closely as possible reach the bit budget for the video frame. How the merging of the first and the second bit stream may be performed will be discussed in the context of specific embodiments.

MBs that are not subject to transmission in step 13 may be taken from the third bit stream and transmitted in step 18. The encoding process for the video frame may be ended in step 19. Encoding of the following video frame may then commence.

Alternative embodiments are possible for the encoding in step 15. In one embodiment, the whole video frame may be encoded in step 15. In an alternative embodiment, only the MBs that are not subject to transmission in step 13 may be encoded in step 15.

Figure 3:
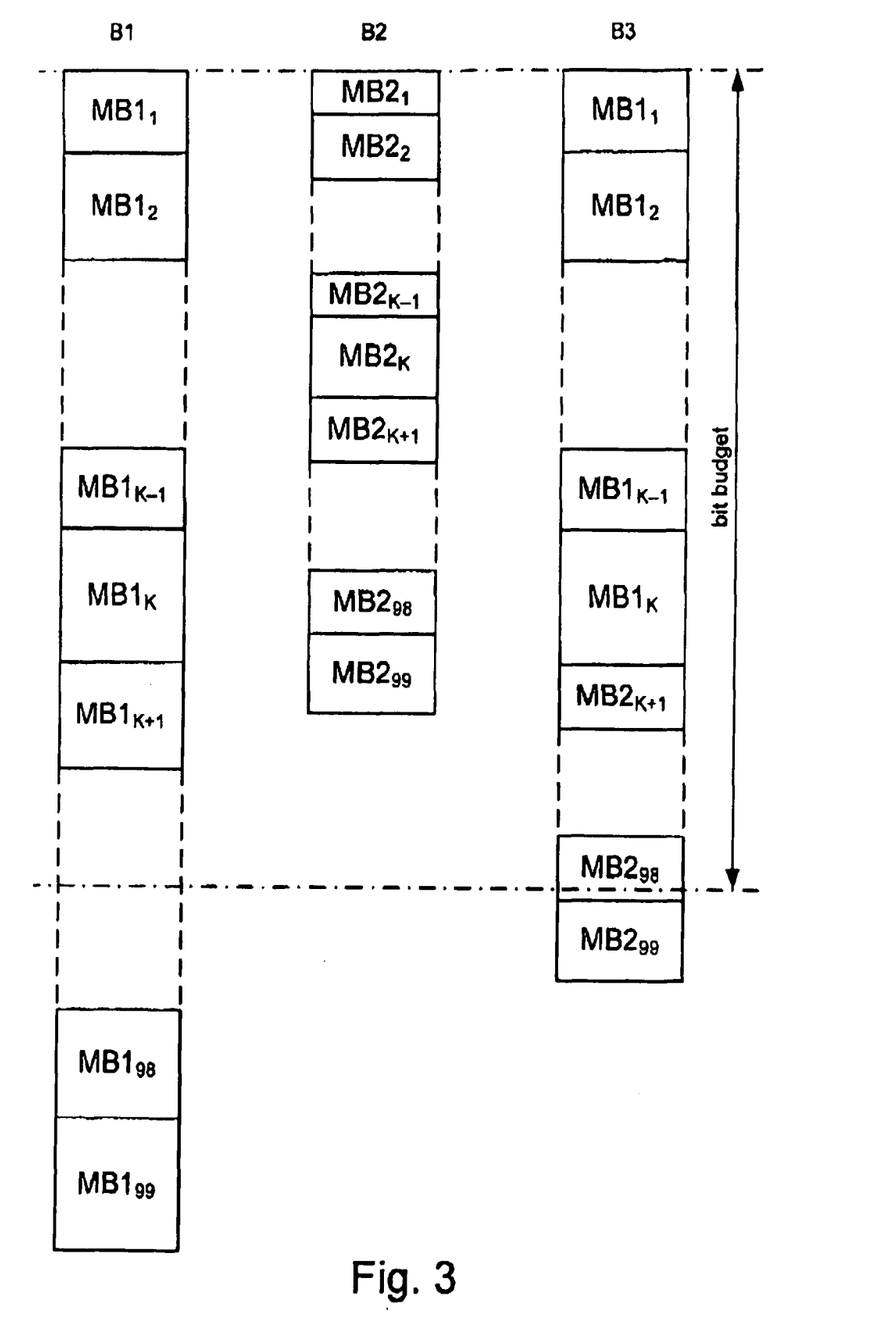
FIG. 3 illustrates schematically a first, a second, and a third bit stream of encoded macro blocks.

FIG. 3 illustrates, with an example, how the first and the second bit stream may be merged in step 17 (FIG. 2). In the example of FIG. 3, each video frame comprises 99 MBs. The first bit stream B1 is shown schematically and the corresponding encoded MBs: $MB1_1$-$MB1_{99}$ are indicated. Further, the second bit stream 82 is also shown schematically and the corresponding encoded MBs: $MB2_1$-$MB2_{99}$ are indicated. In the example, the size of a box representing an encoded MB is proportional to the number of bits in the encoded MB. A bit budget for the example is also shown in FIG. 3. It can be seen that the first bit stream B1 exceeds the bit budget. Therefore, the second QP value generated in step 14 (FIG. 2) is larger than the first QP value. Consequently the second bit stream B2 occupies a smaller number of bits than the first bit stream B1. In the example, the number of bits of the second bit stream falls below the bit budget.

In order to meet the bit budget, the third bit stream B3, which is also shown in FIG. 3, may be generated from the first bit stream B1 and the second bit stream B2 by inserting the first K encoded MBs, $MB1_1$-$MB1_K$, from the first bit stream B1 and the remaining 99-K encoded MBs, $MB2_{K+1}$-$MB2_{99}$, from the second bit stream into the third bit stream B3. More generally, if the video frame comprises a total of N MBs, the first K encoded MBs may be selected from the first bit stream and the remaining N–K MBs may be selected from the second bit stream.

In order to avoid bit rate oscillations, the integer K should ideally be chosen such that the bit budget is exactly met. However, this is normally not possible. In the example of FIG. 3, the third bit stream B3 slightly exceeds the bit budget. This may be compensated for by reducing the bit budget of one or more following video frames. According to an embodiment, K is chosen so that the absolute value of the difference between the number of bits in the third bit stream and the bit budget is minimized. Mathematically, this corresponds to choosing the value of K that minimizes the expression $$\left| \left( \sum_{j=1}^{K} NOB(MB1_j) \right) + \left( \sum_{j=K+1}^{N} NOB(MB2_j) \right) - BB \right| \quad \text{Eq. 1}$$

where $NOB(MB1_j)$ and $NOB(MB2_j)$ denotes the number of bits occupied by $MB1_j$ and $MB2_j$, respectively. BB is the bit budget for the video frame. $NOB(MB1_j)$ and $NOB(MB2_j)$ are known from step 16 (FIG. 2). The value of K that minimizes the expression of Eq. 1 may e.g. be determined using a programmable unit, such as a central processing unit (CPU) or a processor, included in the first and/or second communication unit 1a, 1b. Alternatively, a dedicated hardware block, such as an application-specific integrated circuit (ASIC) may be used.

According to some embodiments, the encoded MBs are subject to additional bit manipulation during the merging of the bit streams in step 17 (FIG. 2). For example, a differential representation may be used for a motion vector of an MB, where the motion vector is represented in the bit stream with the difference between said motion vector and the motion vector of another MB. If there is a correlation between the motion vectors of MBs in the video frame, such a differential representation for the motion vector may enable a reduction of, required storage space for the motion vector. The motion vectors of the encoded MBs in the first bit stream may be different from those of the encoded MBs in the second bit stream, because different QP values have been used for generating the first and the second bit stream. If the third bit stream is generated by simply inserting the encoded MBs from the first and the second bit stream and the differential representation is used for some the motion vectors, they may be erroneously represented in the third bit stream. Therefore, bits in the encoded MBs in the third bit stream that are used for representation of the motion vectors may need to be adjusted to get a correct representation of the motion vectors in the third bit stream.

Further, the QP values used for encoding the macro blocks need to be included in the bit streams to enable decoding of the encoded MBs. Similarly to the motion vectors, a differential representation may be used for the QP values. If a differential representation is used for the QP values, bits in the encoded MBs representing the QP values may need to be adjusted to get a correct representation of the QP values in the third bit stream.

Additional bit manipulation, e.g. of the type described above, may be needed not only in step 17 (FIG. 2), but also in other steps of merging bit streams described herein in the context of various embodiments.

How to carry out the bit manipulations with respect to motion vectors and QP values mentioned above in a particular application can be straightforwardly recognized based on specifications in the video standard (such as the MPEG4, H.263, or H.264 standard) being used in the particular application.

The video frame is encoded twice based on two different QP values in the embodiment of FIG. 2. In alternative embodiments, the video frame may be encoded more than twice based on more than two different QP values. As an example, an alternative embodiment is illustrated with a flow chart in FIG. 4. Steps corresponding to those of the embodiment illustrated in FIG. 2 have corresponding reference numbers or signs in FIG. 4. Steps 10-13 may be carried out as in the embodiment of FIG. 2. A plurality of new QP values may be generated in step 14a. In addition to the second QP value that is generated in the embodiment of FIG. 2, at least one additional QP value may be generated. The plurality of new QP values may be generated based on the bit budget and the size of the first bit stream.

Figure 4:
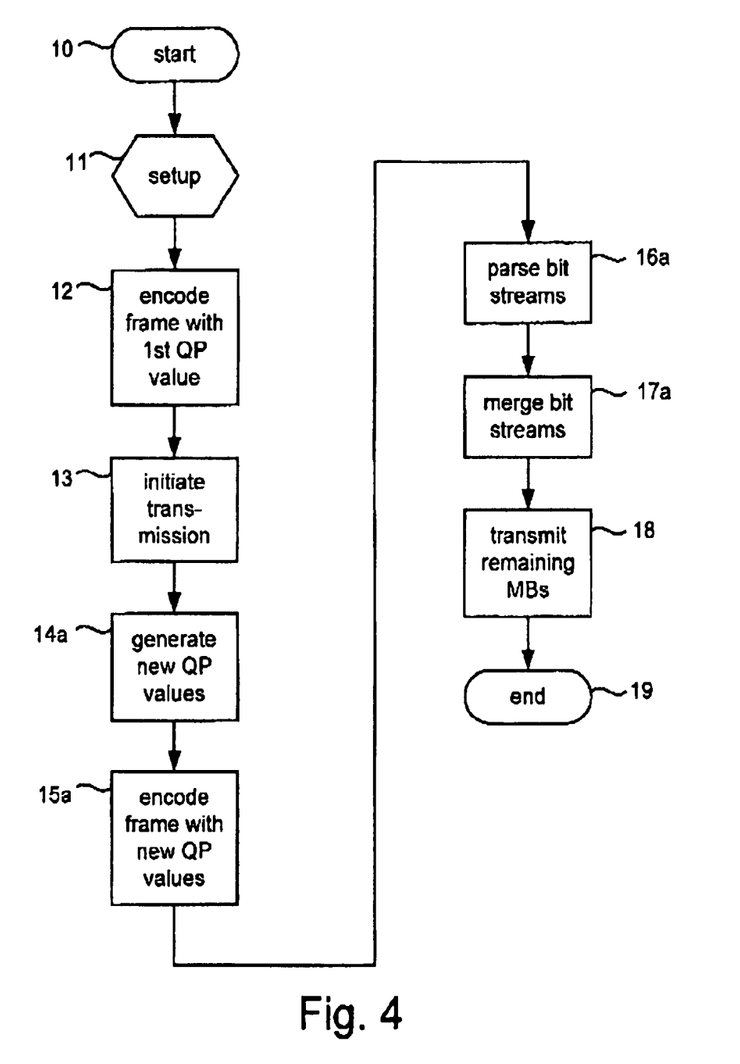
FIGS. 4 and 5 are flow charts of alternative embodiments of methods for encoding a video frame.

The video frame may be encoded based on the plurality of new QP values in step 15a, resulting in a plurality of new bit streams of encoded MBs encoded based on different QP values.

In step 16a, the first bit stream and the plurality of new bit streams may be parsed. The locations and sizes of individual encoded MBs within the first bit stream and each of the plurality of new bit streams may be determined.

The first bit stream and the plurality of new bit streams may be merged in step 17a for generating the third bit stream. For example, one of the plurality of new bit streams may be selected, and the selected bit stream may be merged with the first bit stream, e.g. as discussed above with reference to the example of FIG. 3. For example, the one of the plurality of bit streams that, when merged with the first bit stream, most closely meets the bit budget may be selected for merging with the first bit stream. In alternative embodiments, encoded MBs from more than one of the plurality of new bit streams may be inserted into the third bit stream during the merging in step 17a.

As in the embodiment of FIG. 2, MBs that are not subject to transmission in step 13 may be taken from the third bit stream and transmitted in step 18. The encoding process for the video frame may be ended in step 19. Encoding of the following video frame may then commence.

Figure 5:
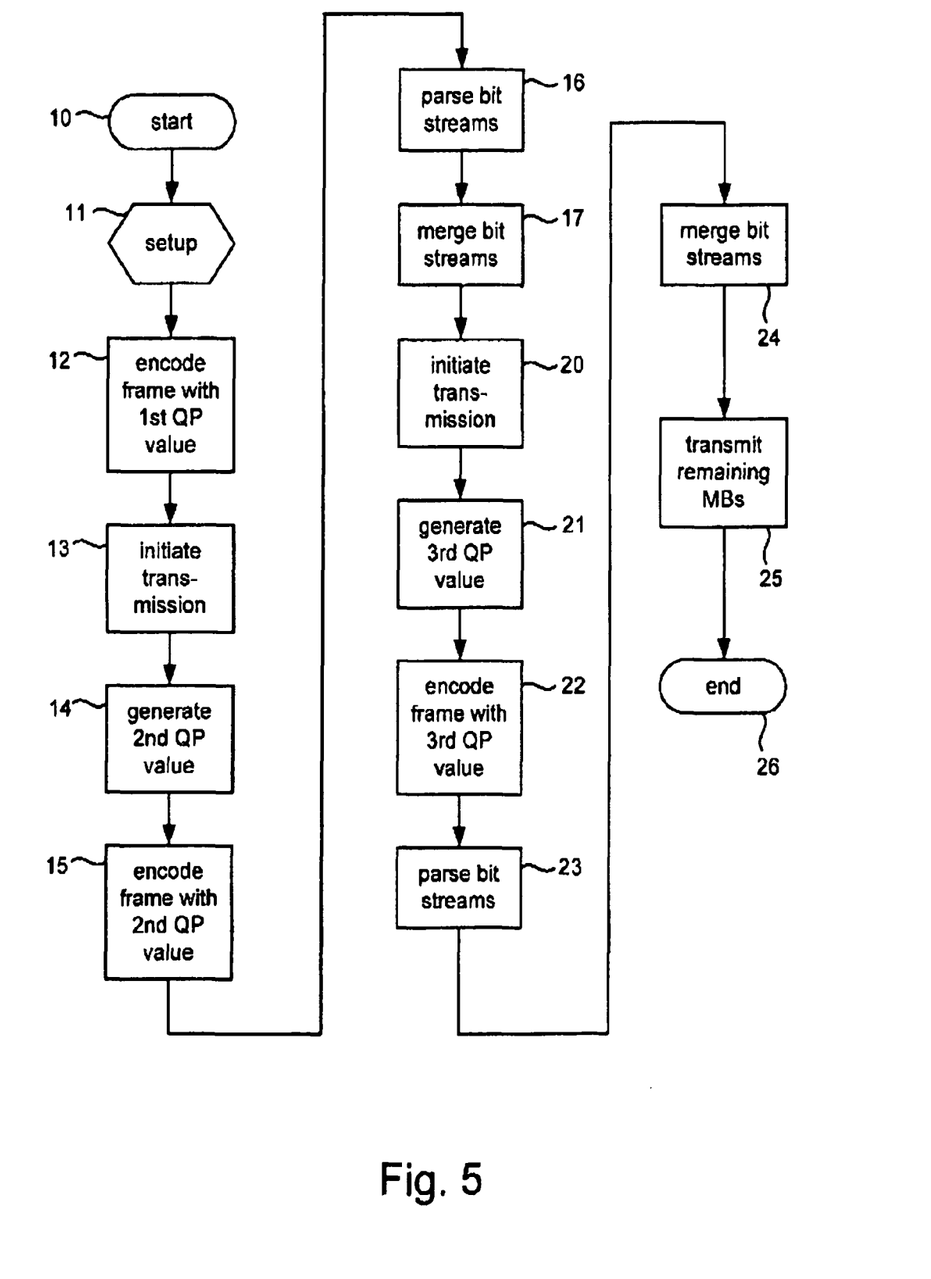

FIG. 5 shows a flow chart for a further alternative embodiment. Steps corresponding to those of the embodiment illustrated in FIG. 2 have corresponding reference numbers or signs in FIG. 5. Steps 10-17 may be carried out as in the embodiment of FIG. 2.

In step 20, a transmission of a subset of the encoded MBs in the third bit stream may be initiated.

The resulting size (number of bits) of the third bit stream may be determined in step 21. Further, a third QP value may be generated based on the first and the second QP value, the size of the third bit stream, and/or the bit budget. For example, the third QP value may be chosen as an average value of the first and the second QP value.

In step 22, the video frame may be encoded based on the third QP value. For example, each of the MBs may be encoded using the third QP value. The encoding in step 22 results in a fourth bit stream of encoded MBs.

The third and the fourth bit stream may be parsed in step 23. The locations and sizes of individual encoded MBs within the third and the fourth bit stream may be determined. Alternatively, information regarding sizes and locations of individual encoded MBs within the third bit stream may be determined already during the merging in step 17. Then, only the fourth bit stream need to be parsed in step 23.

The third and the fourth bit stream may be merged in step 24 for generating a fifth bit stream of encoded MBs. The merging may e.g. be carried out similar to the merging of the first and the second bit stream described above in the context of FIGS. 2 and 3.

MBs that are not subject to transmission in steps 13 and 20 may be taken from the fourth bit stream and transmitted in step 25. The encoding process for the video frame may be ended in step 26. Encoding of the following video frame may then commence.

Alternative embodiments are possible for the encoding in step 22. In one embodiment, the whole video frame may be encoded in step 22. In an alternative embodiment, only the MBs that are not subject to transmission in steps 13 and 20 may be encoded in step 22.

In the embodiment of FIG. 5, the video frame is encoded three times. The embodiment may be extended by e.g. introducing additional steps of generating QP values and encoding the video frame with said generated QP values.

In the embodiments described so far, it has been suggested that a fixed OP value may be used for encoding all MBs during an encoding step, e.g. step 12 (FIGS. 2, 4, and 5), step 15 (FIGS. 2, 5), step 15a (FIG. 4), and step 22 (FIG. 5). In alternative embodiments, the QP values used for encoding individual MBs of the video frame may vary between individual MBs during such an encoding step.

For example, with reference to the flow chart of FIG. 2, the first QP value may be used for encoding the first MB of the video frame in step 12. For the remaining MBs of the video frame, the QP value may be dynamically varied between individual MBs e.g. in accordance with a known rate-control algorithm during the generation of the first bit stream. For the encoding of the video frame in step 15, the QP value used for encoding a specific MB may be generated e.g. by multiplying the QP value used for encoding the corresponding MB in step 12 with the ratio between the second QP value, generated in step 14, and the first QP value. Alternatively, the second OP value may be used for encoding the first MB of the video frame during the encoding in step 15. For the remaining MBs of the video frame, the QP value may be dynamically varied between individual MBs e.g. in accordance with a known rate-control algorithm during the generation of the second bit stream. However, a different bit budget may be used as a boundary condition for the rate-control algorithm than that which was used for the generation of the first bit stream in step 12. For example, if the first bit stream exceeds its bit budget, a smaller bit budget may be used as a boundary condition for the rate-control algorithm during the generation of the second bit stream in step 15. Similarly, if the size of the first bit stream falls below its bit budget, a larger bit budget may be used as a boundary condition for the rate-control algorithm during the generation of the second bit stream in step 15.

In a further alternative embodiment, the QP value used for encoding a specific MB of the video frame in step 12 may be a function of the first QP value. For example, it may be advantageous, e.g. from an image-quality point of view, to encode MBs geometrically located in the center of the video frame with smaller QP values than those used for encoding MBs geometrically located close to the periphery of the video frame. Thereby, a lower degree of compression is used for the central part of the video frame than for the rest of the video frame. Similarly, the QP value used for encoding a specific MB of the video frame in step 15 may be a function of the second QP value.

Encoding a video frame based on a specific (e.g., first, second, or third) QP value should, in light of the above, not be interpreted strictly as encoding all MBs of the video frame using the specific QP value. In some embodiments, the specific QP value may be used for encoding all MBs, whereas in other embodiments, the QP value used for encoding an individual MB may be based on or depend on the specific QP value but be allowed to vary between individual MBs.

In some embodiments, predictive encoding may be used. In these embodiment, a decoded version of the encoded MBs that are subject to transmission are needed for the encoding of a subsequent or following video frame. These embodiments may include an additional step of decoding MBs subject to transmission for generating a decoded video frame. The decoded video frame may be used as a reference video frame during the encoding of the subsequent video frame.

Figure 6:
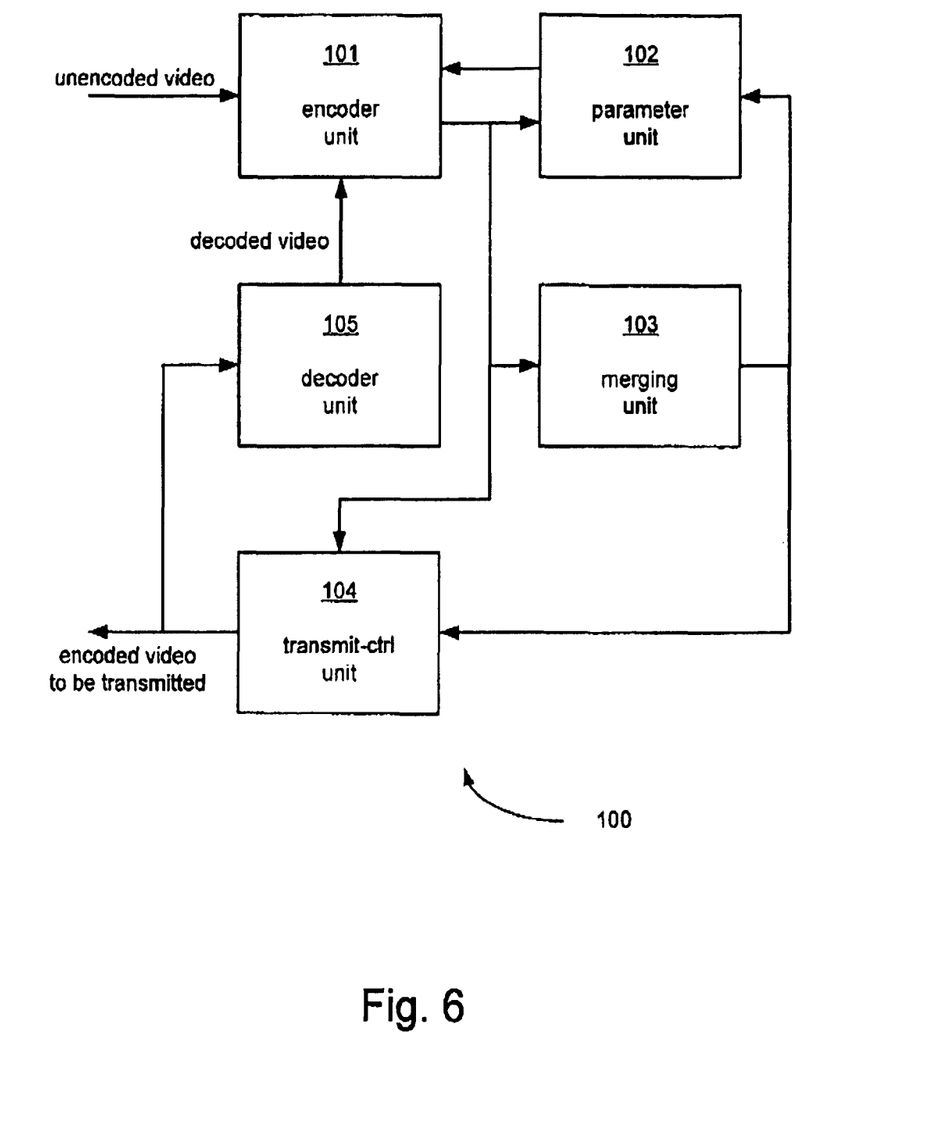
FIG. 6 is a block diagram of an embodiment of an apparatus for encoding a video sequence.

FIG. 6 shows a block diagram of an embodiment of an apparatus 100 for encoding a video sequence. The apparatus 100 may e.g. form part of the video encoding unit included in either or both of the first and the second communication unit 1a, 1b.

The apparatus 100 may comprise an encoder unit 101. The encoder unit 101 may be adapted to encode the video frame at least based on the first and the second quantization parameter for generating the first bit stream of encoded MBs and the second bit stream of encoded MBs, respectively.

The apparatus 100 may further comprise a parameter unit 102. The parameter unit 102 may be operatively connected to the encoder unit 101. For example, the parameter unit 102 may be arranged to receive at least the first and the second bit stream. The parameter unit 102 may further be arranged to supply at least the first and the second QP value to the encoder unit 101. The parameter unit 102 may be adapted to generate the second QP value based on e.g. the first bit stream, the first quantization parameter, and the bit budget.

The apparatus 100 may additionally comprise a merging unit 103. The merging unit 103 may be operatively connected to the encoder unit 101, e.g. for receiving the first and the second bit stream. The merging unit 103 may be adapted to at least generate the third bit stream by merging the first bit stream and the second bit stream.

The apparatus 100 may further comprise a transmit-control unit 104. The transmit-control unit 104 may be arranged to receive at least a part of the first bit stream from the encoder unit 101. The transmit-control unit 104 may further be arranged to receive at least a part of the third bit stream from the merging unit 103. The transmit-control unit 104 may be adapted to initiate transmission of subsets of encoded MBs included in the first and the third bit stream. For example, assuming that the apparatus 100 forms part of the video encoding unit included in the first communication unit 1a, the transmit control unit 104 may be arranged to forward the encoded MBs subject to transmission in the method steps 13 (FIGS. 2, 4, and 5), 18 (FIGS. 2 and 4), 20, and 25 (FIG. 5) described above to communication front-end circuitry (not shown) in the first communication unit 1a for transmission to e.g. the second communication unit 1b over the communication channel 2.

In some embodiments, e.g. the embodiment of FIG. 5, the video frame may be encoded based on more than two QP values and some of the QP values may be based on merged bit streams generated e.g. by the merging unit 103. In such embodiments, the merging unit 103 may be operatively connected to the parameter unit 102 for supplying said merged bit streams to the parameter unit 102 as indicated in FIG. 6.

In some embodiments, predictive encoding may be used. Then, the encoder unit 101 may need to have access to a decoded version of the encoded MBs that are forwarded by the transmit-control unit 104 for the encoding of a following video frame. For that purpose, the apparatus 100 may further comprise a decoder unit 105 operatively connected between the transmit-control unit 104 and the encoder unit 101. The decoder unit 105 may be adapted to decode the output of the transmit-control unit 104 for generating a decoded video frame. The decoder unit 105 may further be adapted to supply said decoded video frame to the encoder unit 101.

It is an advantage that encoded video may be generated with relatively low oscillations in the bit rate. As a consequence, artifacts perceived by a user receiving the encoded video, e.g. during a video telephony conversation, may be removed or reduced compared with when known video encoders for video telephony is used.

Existing image sensors used in e.g. a video camera in mobile telephones are normally relatively slow. For example, if the video camera is set up to deliver 15 video frames per second, it normally takes approximately the whole period of $\frac{1}{15}$ of a second before all pixels of a video frame has been read out from the image sensor. Attempts to decrease the read-out time would result in a degraded image quality. It is an advantage of the present invention that transmission of encoded MBs may be initiated before all MBs have been read out from the image sensor, thereby reducing an overall latency or delay compared with encoding schemes where the whole image need to be read out before transmission can be initiated. Further, due to the relatively low oscillations in bit rate, there is no need for delaying the encoded video in a receiver using e.g. a buffer in order to compensate for bit-rate oscillations. This is also advantageous for reducing the overall latency or delay.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for encoding a video sequence of video frames, each video frame including a plurality of macro blocks, wherein at least a part of the video frame is encoded based on a first quantization parameter value for generating a first bit stream of encoded macro blocks, the method comprising:
    initiating transmission of a first subset of the encoded macro blocks from the first bit stream;
    generating at least one second quantization parameter value;
    encoding, after the step of initiating the transmission of the first subset of encoded macro blocks, at least the part of the video frame, which is not represented by encoded macro blocks in the first subset, based on the at least one second quantization parameter value for generating at least one second bit stream of encoded macro blocks;
    selecting encoded macro blocks from the macro blocks in the first bit stream and the at least one second bit stream and merging the selected macro blocks into a third bit stream of encoded macro blocks representing the video frame, wherein the macro blocks are selected from the first and the at least one second bit stream such that the third bit stream reaches, as closely as possible, a bit budget of the video frame; and
    initiating transmission of a second subset of the encoded macro blocks, not belonging to the first subset, from the third bit stream.

2. The method according to claim 1, wherein the at least one second quantization parameter value consists of a single second quantization parameter value and the at least one second bit stream consists of a single second bit stream.

3. The method according to claim 2, comprising:
    comparing a size of the first bit stream with the bit budget, wherein generating the second quantization parameter value comprises:
        if said size is larger than the bit budget, generating the second quantization parameter value larger than the first quantization parameter value; or
        if said size is smaller than the bit budget, generating the second quantization parameter value smaller than the first quantization parameter value.

4. The method according to claim 1, wherein said at least one second quantization parameter value comprises several quantization parameter values.

5. The method according to claim 1, further comprising:
    parsing the first and the at least one second bit stream for determining the sizes and locations of individual encoded macro blocks within the first and the at least one second bit stream.

6. The method according to claim 1, comprising:
    generating at least one additional quantization parameter value;
    encoding, after the step of initiating transmission of the second subset, at least the part of the video frame, which is not represented by encoded macro blocks in the first subset or the second subset, based on the at least one additional quantization parameter value for generating at least one additional bit stream of encoded macro blocks;

selecting encoded macro blocks from the macro blocks in the third bit stream and the at least one additional bit stream and merging the selected macro blocks into a fourth bit stream of macro blocks representing the video frame, wherein the macro blocks are selected from the third and the at least one additional bit stream such that the fourth bit stream reaches, as closely as possible, the bit budget of the video frame;

initiating transmission of a third subset of the encoded macro blocks, not belonging to the first or the second subset, from the fourth bit stream.

7. The method according to claim 1, wherein said at least one second quantization parameter value is generated based on said first quantization parameter value, a size of the first bit stream, and the bit budget.

8. The method according to claim 1, wherein each of the encoded macro blocks in the first bit stream is encoded with the first quantization parameter value.

9. The method according to claim 1, wherein the quantization parameter value used for encoding the macro blocks in the first bit stream is a function of the first quantization parameter value, which may vary between individual macro blocks.

10. The method according to claim 1, wherein encoding macro blocks based on the at least one second quantization parameter value comprises encoding each of the macro blocks with the at least one second quantization parameter value.

11. The method according to claim 1, wherein encoding macro blocks based on the at least one second quantization parameter value comprises encoding the macro blocks with a quantization parameter value, which is a function of the at least one second quantization parameter value and may vary between macro blocks.

12. The method according to claim 9, wherein said function is smaller for macro blocks positioned close to the center of the video frame and larger for macro blocks positioned close to the periphery of the video frame.

13. The method according to claim 2, wherein the encoded macro blocks are selected from the first bit stream and the second bit stream, so that the first K encoded macro blocks are selected from the first bit stream and the remaining N–K macro blocks are selected from the second bit stream, where N is the total number of macro blocks in the video frame and K is an integer which is selected so that the absolute value of the difference between the number of bits in the third bit stream and the bit budget is minimized.

14. The method according to claim 1, further comprising:
decoding macro blocks subject to transmission for generating a decoded video frame; and
using said decoded video frame as a reference video frame during encoding of a subsequent video frame.

15. A non-transitory computer readable medium having stored thereon a computer program product comprising computer program code means for executing a method when said computer program code means are run by an electronic device having computer capabilities, wherein the method is for encoding a video sequence of video frames, each video frame including a plurality of macro blocks, wherein at least a part of the video frame is encoded based on a first quantization parameter value for generating a first bit stream of encoded macro blocks, the method comprising:
initiating transmission of a first subset of the encoded macro blocks from the first bit stream;
generating at least one second quantization parameter value;
encoding, after the step of initiating the transmission of the first subset of encoded macro blocks, at least the part of the video frame, which is not represented by encoded macro blocks in the first subset, based on the at least one second quantization parameter value for generating at least one second bit stream of encoded macro blocks;
selecting encoded macro blocks from the macro blocks in the first bit stream and the at least one second bit stream and merging the selected macro blocks into a third bit stream of encoded macro blocks representing the video frame, wherein the macro blocks are selected from the first and the at least one second bit stream such that the third bit stream reaches, as closely as possible, a bit budget of the video frame; and
initiating transmission of a second subset of the encoded macro blocks, not belonging to the first subset, from the third bit stream.

16. An apparatus for encoding a video sequence comprising:
an encoder unit adapted to encode a video frame for generating a first bit stream of encoded macro blocks based on a first quantization parameter value;
a parameter unit operatively connected to the encoder unit, where the parameter unit is adapted to generate at least one second quantization parameter value; and
a transmit-control unit operatively connected to the encoder unit, where the transmit-control unit is adapted to initiate transmission of a first subset of encoded macro blocks included in the first bit stream;
wherein:
the encoder unit is adapted to, after the transmit-control unit has initiated the transmission of the first subset, generate at least one second bit stream of encoded macro blocks based on the at least one second quantization parameter value;
the apparatus further comprises a merging unit operatively connected to the encoder unit and adapted to generate a third bit stream, representing the video frame, by selecting encoded macro blocks from the macro blocks in the first bit stream and the at least one second bit stream and merging the selected macro blocks, wherein the macro blocks are selected from the first and the at least one further bit stream such that the third bit stream reaches, as closely as possible, a bit budget of the video frame; and
the transmit-control unit is adapted to initiate transmission of a second subset of encoded macro blocks, not belonging to the first subset, from the third bit stream.

17. A communication unit, wherein the communication unit comprises the apparatus according to claim 16.

18. The communication unit according to claim 17, wherein the communication unit is a mobile telephone with video telephony capability.

* * * * *

UNITED STATES PATENT AND TRADEMARK OFFICE
CERTIFICATE OF CORRECTION

PATENT NO. : 8,548,045 B2  
APPLICATION NO. : 12/294446  
DATED : October 1, 2013  
INVENTOR(S) : Rossholm et al.

Page 1 of 1

It is certified that error appears in the above-identified patent and that said Letters Patent is hereby corrected as shown below:

In the Specification

Column 5, Line 18, delete "transform (OCT)." and insert -- transform (DCT). --, therefor.

Column 7, Line 9, delete "bit stream 82" and insert -- bit stream B2 --, therefor.

Column 7, Lines 65-66, delete "reduction of," and insert -- reduction of --, therefor.

Column 9, Line 47, delete "fixed OP" and insert -- fixed QP --, therefor.

Column 9, Line 63, delete "second OP" and insert -- second QP --, therefor.

Signed and Sealed this  
Sixteenth Day of September, 2014

Michelle K. Lee  
*Deputy Director of the United States Patent and Trademark Office*